United States Patent [19]
Treichel et al.

[11] 3,791,223
[45] Feb. 12, 1974

[54] ADJUSTABLE STEERING COLUMN

[75] Inventors: Richard Treichel; Cleon Arthur Wood, both of Cedar Falls; Fredrick Charles Christenson, Janesville, all of Iowa

[73] Assignee: Deere & Company, Moline, Ill.

[22] Filed: June 28, 1972

[21] Appl. No.: 267,181

[52] U.S. Cl. .................................. 74/493, 74/531
[51] Int. Cl. ............................................. B62d 1/18
[58] Field of Search ............................. 74/493, 531

[56] References Cited
UNITED STATES PATENTS

| 3,032,134 | 5/1962 | Banker | 74/493 X |
| 3,276,287 | 10/1966 | Albrecht | 74/493 |
| 702,980 | 6/1902 | Maxim | 74/493 |
| 973,806 | 10/1910 | Noble | 74/493 X |
| 2,331,996 | 10/1943 | Maurer | 74/493 |
| 3,188,880 | 6/1965 | Caine | 74/493 |
| 3,242,824 | 3/1966 | Jablonsky et al. | 91/380 |
| 3,434,368 | 3/1969 | Runkle | 74/493 |
| 3,491,663 | 1/1970 | Morgan | 74/493 |
| 3,613,477 | 10/1971 | Heise | 74/493 |

*Primary Examiner*—Allan D. Herrmann

[57] ABSTRACT

A tractor has a hydrostatic steering system which includes a hydraulic cylinder and a valve package mounted in a housing disposed immediately in front of the tractor instrument panel. A steering shaft extends upwardly and rearwardly from the housing through the instrument panel and has a steering wheel mounted on its rearward end, the forward end of the steering shaft being connected to the steering valves so that rotation of the shaft actuates the valves. The housing is mounted on a transverse pivot, which permits vertical swinging adjustment of the steering shaft and the steering wheel about the axis of the pivot, a latching device being provided below the instrument panel to lock the housing in the desired position. The rearward part of the shaft, which projects from the housing, includes telescoping portions, which are lockable in different relative axial positions to vary the length of the steering shaft. The locking device includes a wedge member, which is forced into locking engagement with the two telescoping shaft portions in response to rotation of a rod, which is threadably connected to the wedge member and extends rearwardly through the shaft to a knob adjacent the hub of the steering wheel.

2 Claims, 4 Drawing Figures

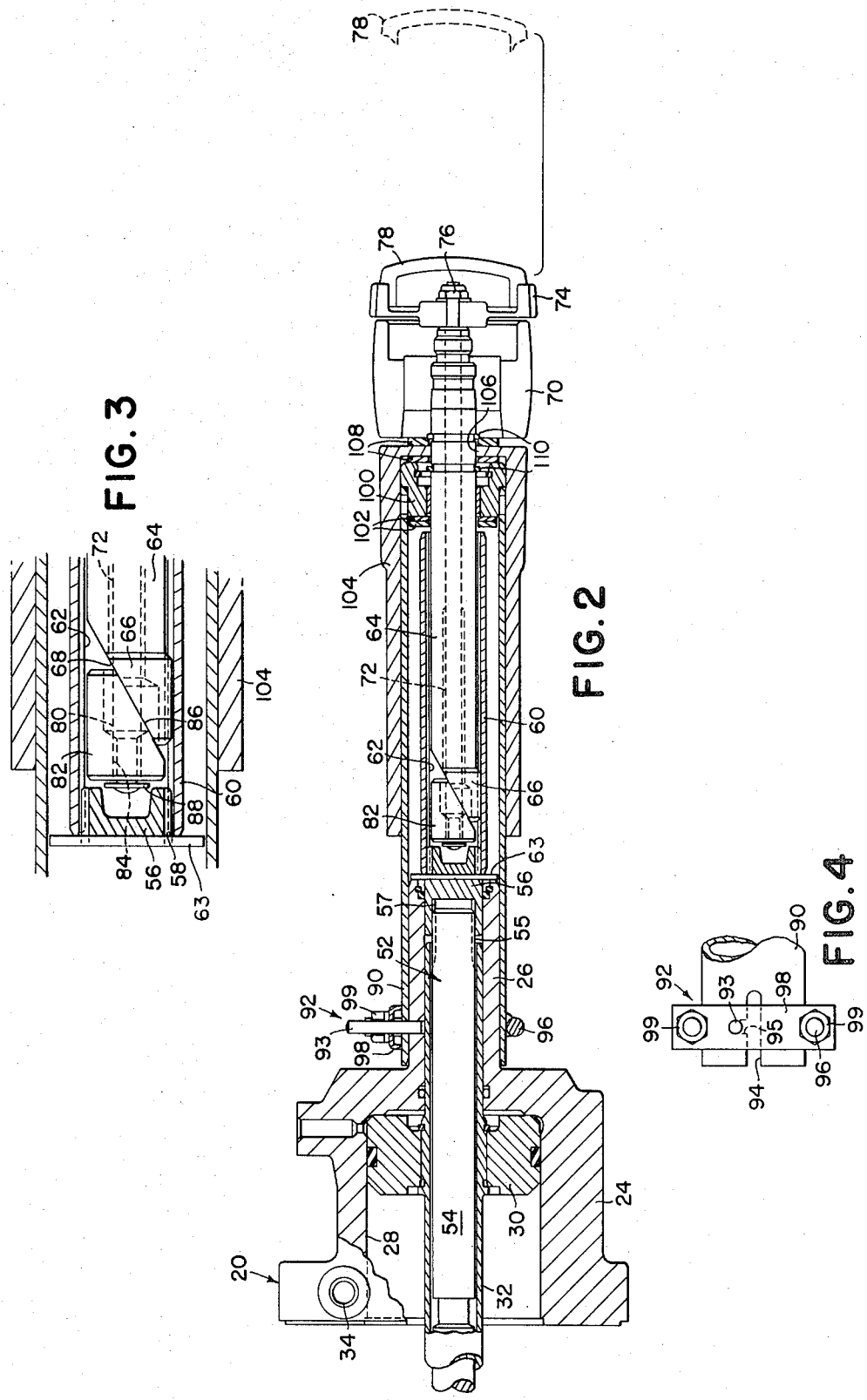

ADJUSTABLE STEERING COLUMN

BACKGROUND OF THE INVENTION

This invention relates to a telescoping and tiltable steering column for an agricultural tractor or the like.

It is known to provide telescoping steering columns and tiltable steerable wheels on automobiles to permit the operator to adjust the steering wheel into the position that is best suited to him, and also to facilitate getting into and out of the automobile. It is also known to provide a wedge-type locking device to lock the telescoping members in the desired position.

With the increasing emphasis on operator comfort and convenience on agricultural or industrial tractors, it has similarly become conventional to provide means for adjusting the tilt of the tractor steering wheel, such tilt adjustment being particularly desirable on tractors where the operator frequently operates the tractor while standing up, the tiltable steering wheel facilitating the control of the tractor from the standing position. In many of the larger tractors, it is also well known to provide hydrostatic power steering systems, such as described in U. S. Pat. No. 2,920,712, issued Jan. 12, 1960 to Richard A Wittren, also assigned to the assignee herein. It is further known to provide a tiltable steering wheel for a tractor having such a hydrostatic steering system, although, generally the valves and the steering valve cylinder have been rigidly mounted on the tractor and the tilting of the steering wheel has been accomplished by use of a universal joint on the steering shaft.

SUMMARY OF THE INVENTION

According to the present invention, an improved tiltable and adjustable steering column is provided for a tractor or the like having a hydrostatic power steering system. More specifically the entire housing for the power steering valves and valve cylinder is pivotally mounted on the vehicle, allowing tilting of the steering column without the requirement for universal joints.

Another feature of the invention resides in improved locking means for selectively locking the telescoping portions of the steering shaft in the desired position. More specifically, the locking device utilizes a wedge member which is pulled rearwardly in response to rotation of a control rod extending coaxially through the rearward part of the steering shaft and having a knob on its rearward end adjacent to the hub of the steering wheel, the wedge member wedging between and engaging the inner and outer telescoping shaft portions when it is shifted rearwardly to lock the telescoping portions in the desired position.

Another feature of the invention resides in the provision of a tiltable and telescoping steering column which can be easily adjusted and locked by the operator from the operator's station.

Still another feature of the invention resides in the provision of a telescoping housing around the telescoping shaft to accommodate the axial adjustment of the shaft and further in the provision of a safety lock for locking the telescoping housing in place and preventing the separation of the telescoping portions of the steering shaft.

BRIEF DESCRIPTION OF THE DRAWINGS

FIG. 2 is a sectional view of the steering column in its fully retracted position, the fully extended portion of the upper end of the steering column being shown in dotted lines.

FIG. 3 is an enlarged sectional view of a portion of the steering column showing the locking mechanism between the telescoping portions of the steering shaft.

FIG. 4 is a plan view of the safety lock for locking the outer telescoping members to the housing.

DESCRIPTION OF THE PREFERRED EMBODIMENT

Figure 1:
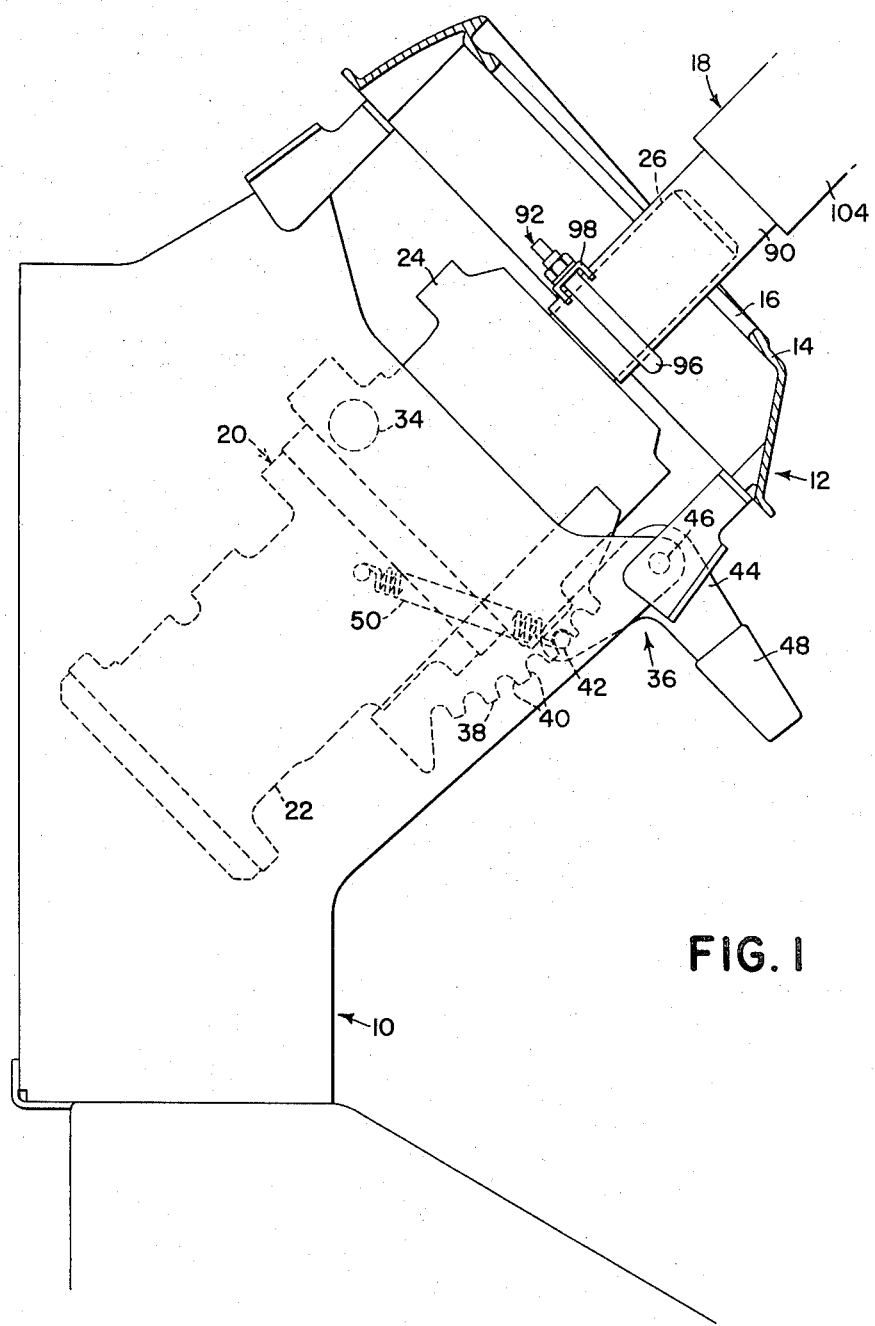
FIG. 1 is a side elevation view of the cowling portion of an agricultural tractor, with the instrument panel cover being shown in section and omitting the instruments thereon to show the lower portion of the steering column.

The invention is embodied in a tractor having a main frame indicated generally by the numeral 10, only the portion of the main frame immediately in front of the operator's station being shown in FIG. 1. A control console 12 projects upwardly and rearwardly from the cowling portion of the main frame and an inclined instrument panel cover 14 is mounted on the control console and faces upwardly and rearwardly toward the operator. For purposes of clarity, the various instruments on the instrument panel are omitted. The instrument panel cover is provided with a generally fore-and-aft slot 16, through which a steering column 18 projects.

The steering column 18 extends upwardly and rearwardly from a housing 20, which includes a lower front portion 22, within which a package of power steering valves (not shown) are mounted. The housing 20 also includes a rear portion 24 having an upwardly and rearwardly extending neck 26 through which the steering column 18 extends. A power steering valve cylinder 28 is disposed in the rear housing portion 24, and an annular piston 30 having a tubular piston rod 32 is mounted in the cylinder 28, the rearward end of the rod 32 extending into the neck 26, while the forward end entends into the front housing portion 22.

The power steering system is a hydrostatic-type steering system of known construction, the general operation of the system being described in said U. S. Pat. No. 2,920,712.

The housing 20 is mounted on the main frame 10 on a transverse pivot 34, which extends outwardly from the opposite sides of the rear housing portion 24 transverse to and offset from the axis of the cylinder 28. Thus, the housing 20 and the steering column 18 mounted therein are swingable in a vertical arc about the axis of the pivot 34, the elongated slot in the instrument panel 14 permitting substantial vertical adjustment of the steering column. Flexible hydraulic lines connect the cylinder 28 and the valves to the steering motor to permit the swinging of the housing.

The housing and the steering column are selectively locked in different angular or tilt positions about the pivot 34 by means of a latching mechanism, indicated generally by thee numeral 36. The mechanism 36 includes an arcuate rack-like element 38 mounted on the housing 20 concentrically with the pivot 34 and having a plurality of generally semi-cylindrical notches 40 engageable by a transverse pin 42 mounted on one end of a bell crank lever 44, which is rockable on the main frame about a transverse pivot 46. A handle 48 is provided on the opposite end of the bell crank lever 44, and a spring 50 extends between the housing and the bell crank lever 44 to bias the pin 42 into engagement with one of the notches 40. As is apparent, the handle 48 extends downwardly and rearwardly below the instrument panel and is easily manipulated by the operator. Pulling the handle upwardly and rearwardly raises the pin 42 from the notch 40, permitting thee steering column to be angularly adjusted, and, as soon as the handle is released, the spring 50 pulls the pin 42 back into one of the notches 40 to lock the housing 20 and the steering column 18 in the selected position.

An elongated steering shaft, indicated generally by the numeral 52, extends coaxially through the tubular piston rod 32 and projects upwardly and rearwardly from the housing. The shaft includes a front or lower section 54 having its forward end connected to the power steering valves and generally disposed within the piston rod 32. The rearward end of the shaft section 54 is provided with an external spline 55, which projects from the rearward end of the piston rod. A coupling member 56 is journaled in the rearward end of the housing neck 26 and has an internal spline 57 mating with the spline 55. The rearward end of the coupling member is provided with an external spline 58 and is connected to an outer or front tubular telescoping shaft portion 60 having an internal spline 62 extending its entire length, the external spline 58 on the coupling member engaging the forward end of the internal spline 62. A washer 63 is mounted around the forward end of the external spline 58 and abuts the rearward end of the housing neck 26, and the forward end of the front shaft portion seats against the washer 63. An inner or rear tubular telescoping shaft portion 64 is coaxially disposed within the outer shaft portion 60 and includes an externally splined element 66 at its forward end, which meshes with the internal spline 62, the remainder of the inner shaft portion 64 being of reduced diameter smaller than the internal diameter of the spline 62. The externally splined element 66 has an inclined cam surface 68, which intersects the axis of the shaft at approximately a 30° angle, the inclined cam surface 68 extending a greater distance than the axial length of the splined element 66, so that the splined surface on the element 66 extends substantially less than halfway around the element at the forward end of the element and only slightly more than halfway around the element at the rearward end of the element.

A conventional steering wheel 70, only the hub of which is shown in FIG. 2, is affixed to the rear end of the shaft portion 64, so that rotation of the steering wheel rotates the inner shaft portion 64 and consequently the outer shaft portion 60 through the meshing splines on the element 66 and the outer shaft portion. The outer shaft portion, in turn, is connected to the front shaft section 54 through the coupling 56, and rotation of the front end of the shaft operates the power steering valves in a known manner.

A control rod 72 extends coaxially through the tubular inner telescoping portion 64 and has a knob 74 secured to its rearward end by means of a nut 76. The knob 74 is disposed immediately on top of the steering wheel hub and has a cover 78, which typically has an emblem on its outer surface. The forward end of the rod has a threaded area 80, which extends into a cam or wedge member 82 having a threaded bore 84, which receives the threaded rod. The cam or wedge member 82 is generally cylindrical and slightly smaller in diameter than the internal diameter of the spline 62. The wedge member 82 also has an inclined cam surface 86 intersecting the axis of the shaft at the same angle as the cam surface 68, the cam surface 86 being flush with and riding along the cam surface 68. As is apparent, the wedge member 82 thus mates with the element 66 on the end of the rear shaft portiOn 64 to form an approximate cylinder, which expands in diameter as the wedge member 82 slides rearwardly along the cam surface 68. Thus, rotation of the control rod 72 via the knob 74 in one direction draws the wedge member rearwardly as the result of the threaded connection between the rod and the wedge member, so that the member 82 wedges between the internal spline 62 on the shaft portion 60 and the element 66 on the shaft portion 64 to lock the two telescoping shaft portions together. Conversely, rotation of the knob in the opposite direction shifts the wedge member 82 forwardly to unlock the telescoping shaft portions and permit telescoping adjustment the length of the shaft, the spline element 66 riding along the internal spline 62 of the shaft portion 60. The inner or rear telescoping portion 64 is shown in its forwardmost position in FIG. 2, its rearwardmost position being indicated by the dotted line outline of the knob cover 78. A washer 88 is secured to the forward end of the control rod 72 to prevent the rod from being totally unscrewed from the wedge member 82.

A tubular member 90 is coaxially mounted on and extends rearwardly from the housing neck 26. While the tubular member 90 is removable from the housing to permit disassembly of the steering column, a locking device 92 is provided to prevent the inadvertent removal of the member during operation of the machine. The locking device includes a pin 93 pressed into and extending radially from the housing neck 26, the pin 93 being receivable in an axially extending slot 94 in the member 90. The slot has a circumferentially extending notch 95, which receives the pin 93 to prevent axial movement of the tubular member 90, the member 90 being mounted on the housing neck by inserting the pin in the slot 94, axially moving the member 90 forwardly, and then rotating the member so that the pin is received in the notch. A U-bolt 96 is welded to the member 90, and its opposite threaded ends are insertable through a pair of bores in the opposite ends of a cross member 98, which is also provided with a central bore, which receives the pin 93 only when the member 90 is rotated so that the pin is disposed in the notch 95. Thus, the cross member 98 cannot be mounted on the U-bolt unless the member 90 is in its locked position, and a pair of nuts 99 are threaded on the opposite ends of the U-bolt 96 to retain the cross member 98 and thereby hold the tubular member 90 in its locked position.

An annular plug 100 is secured to the rearward end of the tubular member 90, the rear telescoping portion 64 being journaled in and axially slidable through the plug 100. A pair of thrust washers 102 are mounted on the shaft portion 64 between the annular plug 100 and the rearward end of the shaft portion 60 to retain the front shaft portion 60 in engagement with the coupling 56. The thrust washers also prevent the axial removal of the rear telescoping shaft portion 64, since the element 66 would engage the thrust washers before the inner shaft portion could be totally removed. Thus, as long as the tubular member 90 is locked to the housing, the rearward portion of the steering shaft and the steering wheel mounted thereon cannot be inadvertently removed.

A rear telescoping member or sleeve 104 is mounted in telescoping fashion on the member 90 and has a closed rearward end except for a bore 106 through which the rear shaft portion extends. The rearward end of the member 104 is clamped between a pair of washers 108 held on the rear shaft portion 64 by a pair of snap rings 110, so that the rear member 104 moves axially with the rear shaft portion.

Thus, the tractor operator can easily adjust the length of the steering column by loosening the knob 74 on the hub of the steering wheel, shifting the steering wheel and the shaft portion 64 connected thereto to the desired position, and then tightening the knob 74, which wedges the member 82 between the telescoping shaft portions 60 and 64 as previously described to lock the shaft portions together. As also previously described, the tilt of the steering column can easily be adjusted by releasing the latching mechanism 36, adjusting the steering column about the pivot 34 to the desired position, and then releasing the latching mechanism so that it again locks the housing and steering column in the selected position.

We claim:

1. An adjustable steering column for a vehicle comprising: a housing having a tubular neck; a transverse pivot means operatively mounting the housing on the vehicle for rocking adjustment of the housing about the pivot means; manually actuatable latching means operatively connected to the housing for selectively locking the housing in at least three different angular positions about said pivot means; an elongated steering shaft rotatably mounted in and extending through the housing neck and including front and rear tubular telescoping portions exteriorly of the housing and spline means operatively connecting said portions for rotation in unison while permitting telescoping axial movement of the rear portion; a steering wheel affixed to the rearward end of the rear portion; a manually rotatable control rod mounted in and extending through the rear portion and having a knob on its rearward end adjacent to the steering wheel and screw threads on its forward end; a wedge member threadably mounted on the forward end of the control rod for axial shifting in response to rotation of the rod, the wedge member engaging a cam surface on the forward end of the rear shaft portion to force the wedge member into locking engagement with the front and rear shaft portions in response to axial shifting of the member in one direction while releasing the shaft portions in response to shifting in the opposite direction to permit telescoping adjustment of the length of the shaft; a first tubular member coaxially and removably attached to the housing neck and coaxially encompassing the length of the front telescoping portion of the steering shaft; a second tubular member mounted on the first tubular member in sealing and telescoping relationship therewith and connected to the rear tubular telescoping portion of the steering shaft for axial adjustment therewith, the telescoping overlap between the first and second tubular members substantially extending the length of the spline means, so that the tubular members enclose the telescoping portions of the steering shaft throughout its entire range of adjustment.

2. The invention defined in claim 1 and including an annular plug attached to the rearward end of the first telescoping member rearwardly of the front telescoping portion of the steering shaft and operative to limit the rearward movement of the front telescoping portion and engageable by the spline means on the rear telescoping portion to prevent axial removal of the rear telescoping portion from the front portion.

* * * * *